May 9, 1933.  S. H. MORTENSEN  1,908,158

ALTERNATING CURRENT DYNAMO-ELECTRIC MACHINE

Original Filed Feb. 16, 1925

Inventor
S. H. Mortensen
by
Attorney

Patented May 9, 1933

1,908,158

UNITED STATES PATENT OFFICE

SOREN H. MORTENSEN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

ALTERNATING CURRENT DYNAMO-ELECTRIC MACHINE

Application filed February 16, 1925, Serial No. 9,401. Renewed June 17, 1932.

This invention relates in general to alternating current motors, and it has particular relation to alternating current motors of the synchronous type wherein closed-circuit windings are utilized for improving the starting characteristics of the motor and for preventing or limiting hunting or oscillation in speed during normal operation of the motor.

In the design and construction of alternating current motors embodying a closed-circuit winding on an element acting as the secondary of the motor, either for starting purposes only or for both starting and normal running purposes, it is especially desirable that the winding be of a type which insures the production of the desired high starting torque and also the required running torque under conditions of maximum efficiency, and that the desired results be attained without too great current being drawn from the supply line and undue heating of the winding and consequent dangerous results occurring.

The recent commercial tendency as to the design and operation of synchronous motors requires that such motors be possessed of higher starting torque than had been demanded in the past. In fact, within the last few years, synchronous motors are rapidly being substituted for induction motors in a field which, up to a very short time ago, had been considered as practically an exclusive field for induction motors. This change in commercial practice has been effected mainly through the successful design and operation of synchronous motors possessed of high overload capacity and extremely high starting torque, some of the recent designs of synchronous motors starting practically almost as readily as induction motors, where the starting torque required does not greatly exceed full load torque of the motor.

In the successful design of synchronous motors of required high starting torque characteristics, it is desirable that the synchronous or pull-in torque be as great as possible; and, hence, the design of any individual motor is preferably such as to insure the required starting torque with no more sacrifice of synchronizing torque than is absolutely necessary. This feature of securing the required starting torque along with maximum pull-in torque makes it desirable that there be considerable range or adjustability in the matter of the resistance characteristics of at least a portion of the closed-circuit starting winding of the motor; and, obviously it is desirable that this adjustability be secured with the least possible changes in the design of the mechanical features of the motor.

The present invention contemplates a design and construction of alternating current motor, more particularly one of the synchronous type, embodying a closed-circuit winding for the field or secondary element of the motor, which winding is of a type readily permitting and securing the above advantages and wherein the winding is of particularly rigid design, especially as to the feature of securing the parts thereof together and securing the winding as a whole in position on the core. Further, the invention contemplates the production of a closed-circuit winding having the desirable feature of readily facilitating changing the resistance characteristics of the winding merely through a change in a relatively small and accessible part of the winding. Likewise, the invention contemplates a winding of the desired character and of such design and construction as to produce minimum interference with the ventilation or cooling of the field windings of the motor, while being possessed of the ability to readily dissipate a maximum quantity of heat with the least deleterious effect on the insulation of the windings of the motor. Additional features, both electrical and mechanical, of the present design and construction contribute to afford and produce highly desirable operating results in the motor.

It is an object of the present invention to provide an alternating current motor of improved design and construction including a closed-circuit winding having cross-connectors and an end-connecting ring therefor embodying one or more of the advantageous features hereinabove set forth.

It is a further object of the present invention to provide an alternating current motor of the synchronous type and of improved design and construction embodying one or more of the above desirable features and including a closed-circuit winding on the direct current field element of the motor having cross-connectors associated with the field poles adjacent polar faces thereof and an end-connecting ring therefor radially spaced from the cross-connectors.

It is a further object of this invention to provide an improved design and construction of synchronous motor of the general character described embodying a closed-circuit winding on the direct current element of the motor, this winding including cross-connectors associated with the polar faces of the field poles and end-connecting rings radially spaced from the cross-connectors and mounted in efficient heat-dissipating relation to the field core or its support, and the connection between the cross-connectors and the end-connecting rings being through separable connecting links.

These and other objects and advantages are attained by the present invention, various novel features of which will be apparent from the description and drawing herein, disclosing several embodiments of the invention, and will be particularly pointed out in the claims.

Figure 1:
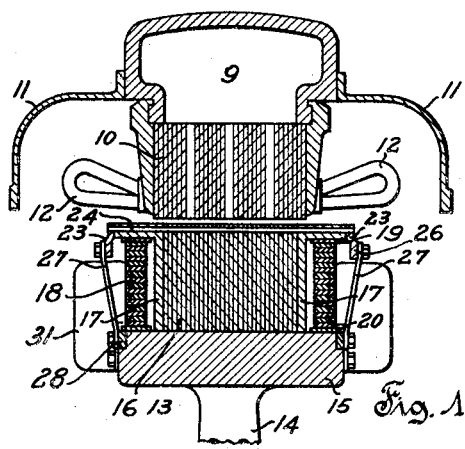
Fig. 1 is a fragmental sectional elevation of a synchronous motor embodying features of this invention, the sectional plane being that of the line I—I of Fig. 2.
Figure 2:
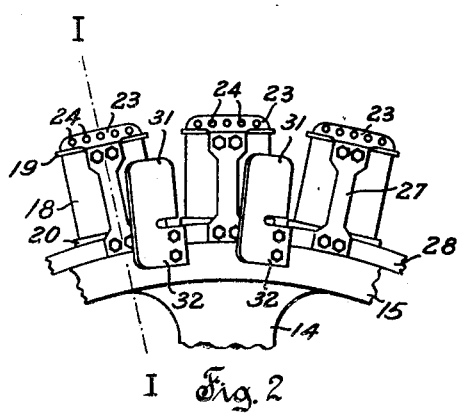
Fig. 2 is a fragmental side elevation of the motor shown in Fig. 1.

As disclosed in Figs. 1 and 2 of the drawing, a stator of a motor comprises a supporting frame 9 carrying a laminated core 10 and end shields 11 associated with the frame. The core is slotted at its inner periphery for the reception of an alternating current winding 12, of the distributed type, the inductor portions of the winding being suitably held in position in the slots by wedges or otherwise. The rotor 13 of the motor comprises a spider 14, or other support carried by the shaft, and a rim-like element 15 of magnetic material which is included in the magnetic circuit of the rotor. A plurality of definite polar portions in the form of spaced poles 16 of ordinary construction, preferably laminated, are secured to the rim 15 in a suitable manner, as by being bolted thereto, each of these poles 16 including a radially extending body portion having the usual pole tips of ordinary form, the laminations being held between relatively heavy end plates 17 provided with laterally extending flanges at their radial outer extremities, as indicated. A direct current winding 18 is mounted in operative position on each of the field poles, preferably between a relatively rigid supporting plate 19 located beneath the pole tips and a corresponding plate 20 disposed between the inner end of the winding coil and the supporting rim 15. The relativelly stiff supporting plate 19, in the ordinary design of synchronous motor, is in the form of or constitutes a single closed turn about the pole and is of metal of relatively low resistance, primarily so that it may not only have the required rigidity, but also that it may have a damper effect during operation of the motor at synchronous speed. However, in order to obtain maximum effective torque at the higher speeds during the starting operation, when the torque is ordinarily relatively small, the supporting plates 19 and 20 may be made electrically discontinuous, if constructed of metal, or they may be constructed of substantially non-conductive material.

A closed-circuit winding is disposed in operative relation to the polar faces of the field pole 16, this winding comprising side bars or sections 23, preferably in the form of castings or stampings, on opposite sides of each of the poles adjacent the polar faces thereof, and cross-bars 24 extending through the face portions of the poles, radially outside of the energizing winding 18 of the poles, these cross-bars being preferably located substantially equidistant from the axis of the rotor, and passing through the flanges at the radially outer extremities of the end plates 17 and connected at their ends to the sections 23 by riveting, brazing, or otherwise, so as to be securely united therewith both mechanically and electrically. The arrangement of the conductors or cross-bars described is such as to give the effect of a closed-circuit winding or grid for each field pole; and these cross-bars may be of any desired electrical characteristics as to resistance and reactance, both by reason of their inherent construction and composition and also the arrangement thereof with respect to the magnetic material of the poles. In general, where high starting torque is the primary factor, these bars are of brass and of relatively high resistance and little or no inductance; while where maximum damping effect is more of a desideratum, the bars may be of relatively low resistance and high reactance.

The side bars or sections 23 have a substantially centrally located, laterally offset or inwardly extending projection 26 which is appreciably spaced from the sides of the flanges on the end plates 17 and the sides of the winding 18. Instead of the ordinary construction wherein the end-connecting elements or bars on adjacent poles are connected together directly or through the intermediary of a single link, the present invention includes radially extending links 27 each connected at its outer extremity to the projection 26 at the inner side of the end-connecting bars 23, and at its inner end to an end-connecting ring or device 28. As indicated, the links 27 are separate from and attached to the side bars 23 and the end-connecting rings 28, as by bolts or the like, and are of such size and material as to impart to the closed-circuit winding the desired mechanical and electrical characteristics, without permitting any of these parts to be subjected to undue strain. As indicated, each end-connecting ring 28 is preferably disposed in a machined, shouldered recess at the side of the rim portion 15 of the magnetic core, with the inner periphery and the inner side of the ring in surface engagement with the material of the core 15, the arrangement described greatly facilitating the transfer of heat from the ring to the core, since these sides or surfaces of the ring in intimate engagement with the core are immediately adjacent the active current-carrying portions of the ring, i. e., those portions containing the axis or median line of the current path through the ring, or the loci of the points of the ring of both average and maximum current density during operation of the machine. The end-connecting rings 28 may be held in operative position by the same bolts as are used for attaching the links to the end ring. The preferable arrangement of the parts includes placing the supporting plate 20 with a portion thereof radially outside of a portion of the end-connecting ring 28.

Figure 3:
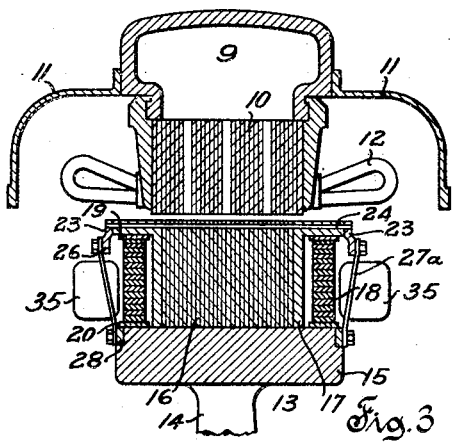
Fig. 3 is a view similar to Fig. 1 showing a modification of a detail of the invention, the sectional plane being that of the line III—III of Fig. 4.
Figure 4:
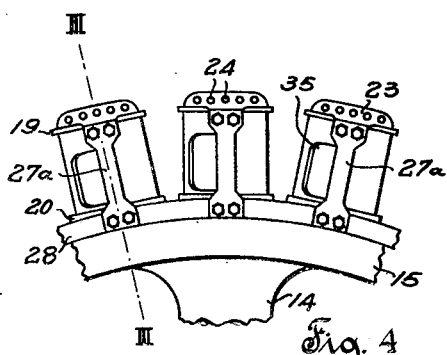
Fig. 4 is a fragmental side elevation of the motor shown in Fig. 3.

For the purpose of assisting in cooling the parts of the motor and its winding during operation, a series of ventilating fan blades 31 are provided. These fan blades are preferably formed or bent from a single piece of material having a flanged portion arranged to lie against and be secured, as by bolts, to the side of the end-connecting ring 28 or rim portion of the core 15, or to both of these elements. During operation of the machine, air is circulated across the sides of the core and the end-connecting ring and radially outward along the connecting links 27 and the end-connecting bars or devices 23. In the modification shown in Figs. 3 and 4, the fan blades are shown as being carried by and extending across the connecting links 27a which form a part of a closed-circuit winding. These fan blades may be separate from and attached to the links or they may be formed integral therewith by casting or by shaping the parts from sheet material.

Figure 5:
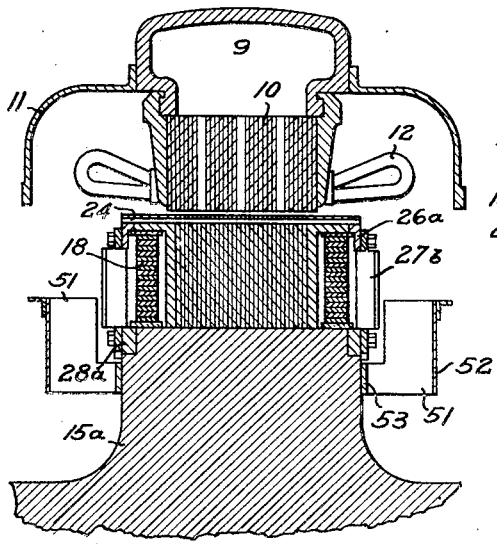
Fig. 5 is a view similar to Fig. 1 showing a modification of details of the invention, the sectional plane being that of the line V—V of Fig. 6.
Figure 6:
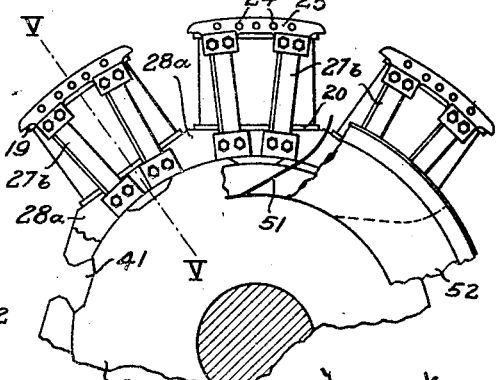
Fig. 6 is a fragmental side elevation of the motor shown in Fig. 5.

In the modification shown in Figs. 5 and 6, the spider 14 is omitted, the rim-like portion of the magnetic core 15 extending inwardly the entire distance to and being directly mounted upon the shaft, and being provided at its periphery with plane seats for the several pole pieces 16 which are preferably formed with radially inner dove-tail extensions designed to be inserted and held in operative position within the correspondingly shaped recesses 41 in the core. The end-connecting rings 28a are of polygonal shape at their outer periphery to correspond and lie flush with the outer periphery of the core 15, the winding supporting plates 20 being mounted directly on the core 15 and extending laterally over the end-connecting rings, thus assisting in holding these rings in position. Instead of a single extension at the inner side of each of the end-connecting sections or side bars 23 and a single corresponding link 27, each of the sections 23 of this latter modification is provided with a plurality of extensions 26a, links 27b being connected to these extensions and to the end-connecting ring 28a with terminal portions of the links 27b preferably enlarged and extending over the sides of the recesses 41, as indicated. These links 27b may be warped, skewed, or bent in some fashion to provide integral fan blades for assisting in maintaining the windings and the general structure in cool operating condition. Additional ventilating means may be provided in the form of fans having blades 51 disposed substantially axially outside of and supported radially within the combined connecting links and fan blades 27b, the blades of this fan 51 being disposed between, and carried by a casing in the form of, spaced supporting rings 52, 53, and the fan being mounted in position as by being bolted to the rotor core 15 by bolts passing through the ring 53.

During operation of the several embodiments of the invention disclosed hereinabove, considerable heat may be generated in the closed circuit winding, especially during the starting of the motor, a great portion of the heat being generated in the connecting links 27, 27a, 27b and the end-connecting rings 28, 28a, rather than at a point immediately adjacent the air-gap of the motor and the stator windings. By having the end-connecting ring to which these links are connected, in direct physical contact with the material of the core, a great amount of the heat generated in and transmitted to the end-connecting rings is transmitted to the core 15 and thereby more readily dissipated through the greater area of the ring and core. Likewise, with substantially the same design of the motor as to the feature of cross-bars passing through the polar faces and the end-connecting sections therefor, connecting links 27 and, if desired, end-connecting rings 28, of any particular electrical characteristics desired, may be used, depending upon the particular starting or synchronizing characteristics desired in the motor, or such parts, especially the links 27, may be replaced by other links having different characteristics, if test results indicate such replacement to be desired.

It will be apparent that, in accordance with the present invention, there is provided a construction wherein the parts of the closed circuit winding including the cross-connectors and the end-connectors therefor and connecting links associated therewith may be supported, to a greater or less degree as desired, from the rotor spider or core, the arrangement permitting holding the damper construction and associated parts as rigidly as may be required or desired. Further, through this construction, it becomes a simple matter to change the starting or operating characteristics of the motor merely by changing either the material or the cross-sectional area of the connecting links 27, 27a, 27b. Again, by placing the links and the end-connecting rings, which may constitute the real heat generating source of the winding, remote from the stator winding at the air gap and also removing or spacing the links from the direct current field winding, these windings are left as open as possible to ventilation and cooling and are not directly subjected to the more highly heated elements of the closed-circuit winding.

By securing the end-connecting ring 28, more particularly the active current-carrying part thereof, in a finished groove in the rotor spider or core, the proper support for the parts of the closed-circuit winding is insured and, likewise, the ready flow of heat from the ring and associated parts of the winding to the material of the core permits dissipation of a much larger amount of energy in this ring during the starting period than would otherwise be practicable. Again, by partially embedding the end-connecting ring 28 in the recess of the solid and relatively massive rim-like portion 15 of the core, as indicated, the reactance of this portion of the winding is a minimum, permitting maximum current to flow during the initial stages of starting, with consequent increase of starting torque while insuring maximum results in the matter of dissipation of heat from the end-connecting element. Further, the fact that these end rings are located remote from the stator coils and, in fact, are considerably spaced from the field winding, makes it permissible to attain much higher temperatures in the end-connecting rings and links than would be advisable if the latter were located adjacent the air-gap. As indicated, the number of connecting links 27, 27a, 27b associated with each end-connecting section or side bar 23 may be whatever is desirable for the particular design at hand and the desired operating characteristics of the motor. In certain instances, the rings 28 may be omitted and the rim-like portion 15, or core body 15a of Figs. 5 and 6, may serve as the current-carrying element of the closed-circuit winding, in this case, the links 27, 27a, 27b being directly connected to the rim or spider.

It should be understood that the invention claimed is not limited to the exact details of construction shown and described herein, for it will be apparent that obvious modifications will occur to persons skilled in the art.

It is claimed and desired to secure by Letters Patent:

1. In an alternating current dynamo-electric machine, a rotary core of magnetic material including a solid supporting portion provided with a recess in a side wall thereof at a point remote from the periphery of the core, and a closed-circuit winding comprising conductor bars passing through peripheral portions of said core, a short-circuiting element having its active current-carrying portion secured to said supporting portion in intimate heat transferring engagement with the wall of said recess, and connecting devices between said conductor bars and said short-circuiting element, said connecting devices including radially extending links each serving as a portion of a common path between a plurality of said conductor bars and said short-circuiting element.

2. In an alternating current dynamo-electric machine, a rotary core of magnetic material, and a closed-circuit winding comprising conductor bars passing through peripheral portions of said core, individual end-connecting segments separate from each other and each interconnecting ends of a group of conductor bars, a short-circuiting element radially spaced and remote from said conductor bars, and detachable resistance links connecting said individual end-connectors and said short-circuiting element, said connecting links being less in number than said conductor bars.

3. In an alternating current dynamo-electric machine, a rotary core of magnetic material having a supporting portion, and a closed-circuit winding comprising conductor bars passing through peripheral portions of said core, individual end-connecting segments each interconnecting a group of conductor bars, a short-circuiting element radially spaced from said conductor bars and having a portion thereof constituting the active current-carrying path therethrough secured to the side of said supporting portion in intimate heat transferring relation therewith and at a point remote from said conductor bars and said end segments, and separate connecting links detachably connected between said end-connecting segments and said short-circuiting means, said connecting links being less in number than the conductor bars connected to the individual end connectors.

4. In an alternating current dynamo-electric machine, a rotary core of magnetic material having a supporting portion, and a closed circuit winding comprising conductor bars passing through peripheral portions of said core, individual end-connecting segments each interconnecting a group of conductor bars, a short-circuiting element radially spaced from said conductor bars and having a portion thereof constituting the active current-carrying path therethrough secured to said supporting portion in intimate heat transferring relation therewith, and connecting links between said end-connecting segments and said short-circuiting element, said connecting links being less in number than the conductor bars connected to said segments, and fan blades carried by said links and comprising portions disposed at an angle to the body portion of said links.

5. In a synchronous alternating current machine, a rotary field element having a rim-like support, and a plurality of salient poles carried by said support, energizing windings surrounding said poles, and a closed-circuit winding comprising conductor bars passing through said poles adjacent the polar faces thereof, individual end-connectors interconnecting ends of the conductor bars associated with each pole, a short-circuiting element whose active current-carrying portion is radially within and remote from said conductor bars and said individual end-connectors and secured to said rim-like support in intimate heat transferring engagement therewith, and connecting links formed separate from and connected to said end-connectors and said short-circuiting element, said links being less in number than the conductor bars connected to said end-connectors and spaced from said energizing windings.

6. In a synchronous alternating current machine, a rotary field element having a rim-like portion, and a plurality of salient poles carried thereby, said rim-like portion being provided with a circumferentially extending recess adjacent its outer periphery, energizing windings surrounding said poles, a closed-circuit winding comprising conductor bars passing through said salient poles adjacent the polar faces thereof, individual end-connectors for interconnecting ends of the conductor bars associated with each projecting pole, a short-circuiting element radially spaced from said conductor bars and said end connectors and disposed in the recess in said rim-like portion and secured in intimate heat transferring and electrical engagement with the wall of the latter, and separately formed and spaced resistance links connected to said end-connectors and said short-circuiting element, said links being spaced from said energizing windings, and fan blades carried by said links.

7. In a synchronous alternating current motor, a rotary field element including a core of magnetic material having a rim-like supporting portion provided with a circumferentially extending recess at its side and adjacent its periphery, and a plurality of projecting poles carried by said supporting portion, field coils surrounding said field poles, and a closed-circuit winding comprising conductor bars passing through said projecting poles adjacent the polar faces thereof, individual end-connectors for interconnecting the ends of the conductor bars associated with each projecting pole, said end-connectors having projections less in number than said conductor bars and extending radially inward from the body portion of the connector alongside the field coil and spaced therefrom, an end-connecting ring radially within and spaced from said conductor bars and individual end-connectors and having a portion disposed in said recess radially within said field coils and secured in engagement with the wall of said recess, and spaced resistance links connected between the projections on said end-connectors and said end-connecting ring and extending along and spaced from said field coils.

8. In a synchronous alternating current motor, a rotary element including a support, and a plurality of salient poles mounted on said support, energizing windings surrounding said poles, and a closed-circuit winding for said element comprising conductor bars passing through said poles adjacent the polar faces thereof, and means for interconnecting the ends of said conductor bars, said interconnecting means comprising a plurality of circumferentially spaced and substantially radially extending resistance links less in number than said conductor bars and disposed outside of and spaced from said energizing windings and fixedly secured in position relative to said support and with the active electrical path through said links established through portions of said support radially within said energizing windings.

9. In a synchronous alternating current dynamo-electric machine, a rotatable field element comprising a support, and a plurality of salient field poles mounted on the periphery of said support, energizing windings on said poles, said poles each including end plates having laterally extending flanges adjacent the polar faces of said poles, a plurality of conductor bars passing through the body of each of said field poles adjacent the polar face thereof and through the flanges on the end plates of said poles, individual end-connectors axially outside of the flanges on said end plates and interconnecting the ends of the conductor bars extending through each of said field poles, a short-circuiting element having its active current-carrying portion radially spaced from said conductor bars and said end-connectors and secured to said support, and circumferentially spaced connecting links interconnecting said end-connectors and said short-circuiting element.

10. In a synchronous alternating current dynamo-electric machine, a rotatable field element comprising a support, and a plurality of salient field poles mounted on the periphery of said support, energizing windings on said poles, said poles each including end plates having laterally extending flanges adjacent the polar faces of said poles, a plurality of conductor bars passing through the body of each of said field poles adjacent the polar face thereof and through the flanges on the end plates of said poles, individual end-connectors axially outside of the flanges on said end plates and interconnecting the ends of the conductor bars extending through each of said field poles, a short-circuiting element having its active current-carrying portion radially spaced from said conductor bars and said end-connectors and secured to said support in intimate engagement therewith, and circumferentially spaced and radially extending resistance links less in number than said conductor bars and connecting said end-connectors and said short-circuiting element.

11. In a synchronous alternating current motor, a rotary field element comprising a core of magnetic material having a rim-like supporting portion and a plurality of salient poles carried by said supporting portion, said poles each comprising end plates provided with flanges adjacent the polar faces of the pole, energizing windings surrounding said poles beneath the flanges on said end plates, and a closed-circuit winding comprising conductor bars passing through each of said projecting poles radially outside of the energizing winding thereon, individual end-connectors disposed laterally outside of the flanges on said end plates and connecting the ends of the conductor bars in each pole, said end-connectors being provided with radially extending projections, a short-circuiting ring within and radially spaced from said conductor bars and having its active current-carrying portion secured in intimate heat transferring engagement with said supporting portion of said core, and spaced resistance links less in number than said conductor bars connected between the radially extending projections of said individual end-connectors and said short-circuiting ring, said links being disposed outside of and spaced from the energizing windings on said poles.

12. In a synchronous alternating current machine, a rotary field member comprising a relatively massive annular support of magnetic material spaced from the rotor shaft, and a plurality of salient poles mounted on said support, energizing windings surrounding said poles, and a closed-circuit winding comprising conductor bars passing through said poles adjacent the polar faces thereof, a short-circuiting element having its active current-carrying portion radially spaced from said conductor bars and secured to said support with the major part of its active current-carrying path in intimate heat transferring engagement with said support, and spaced radially extending links between the ends of said conductor bars and said short-circuiting element, said connecting links being less in number than said conductor bars.

13. In an alternating current dynamo-electric machine, a core of magnetic material, and a closed-circuit winding comprising conductor bars passing through peripheral portions of said core, individual end-connecting segments each interconnecting adjacent ends of a group of said conductor bars, a short-circuiting element mounted in intimate heat transferring engagement with said core at a point radially within and remote from said conductor bars, and spaced radially extending connecting devices between said end-connecting segments and said short-circuiting element, said connecting devices being less in number than said conductor bars.

14. In an alternating current dynamo-electric machine, a rotary core element including a relatively massive supporting portion of magnetic material providing the active magnetic flux-carrying path of the core, and a closed-circuit winding comprising conductor bars passing through peripheral portions of said core, a short-circuiting element having its active current-carrying portion radially within and remote from said conductor bars and having surface portions thereof of extended area immediately adjacent the median line of the active current-carrying path through said element secured in intimate heat transferring and magnetically linked relation with said supporting portion which forms the active flux-carrying path, and spaced connecting devices between said conductor bars and said short-circuit element, said connecting devices being less in number than said conductor bars.

15. In a synchronous alternating current machine, a field member comprising a support constituting the active portion of the magnetic flux-carrying path of said field member, and a plurality of salient poles extending from said support, energizing windings surrounding said poles, and a closed-circuit winding comprising conductor bars passing through said poles adjacent the polar faces thereof, individual end-connectors each interconnecting adjacent ends of a group of said conductor bars, a short-circuiting element having its active current-carrying portion radially spaced from said conductor bars and secured in intimate heat transferring engagement with an active flux-carrying portion of said support, and spaced connecting devices between said end-connectors and said short-circuiting element and less in number than said conductor bars.

16. In a synchronous alternating current machine, a rotary field element comprising a supporting spider, an annular member of magnetic material carried at the radially outer part of said spider, and a plurality of salient poles mounted on said annular member, said annular member constituting the normal magnetic path between adjacent poles, energizing windings surrounding said poles, and a closed-circuit winding comprising conductor bars passing through said poles adjacent the polar faces thereof, end-connectors each interconnecting adjacent ends of a group of said conductor bars, a short-circuiting element having its active current-carrying path radially spaced from said conductor bars and having an extended surface area thereof in intimate heat transferring engagement with and magnetically linked with said annular magnetic member at a point remote from said conductor bars, and spaced and substantially radially extending connecting devices between said end-connectors and said short-circuiting element and less in number than said conductor bars.

17. In a synchronous alternating current machine, a field member comprising a relatively massive core element of magnetic material comprising a supporting portion and a plurality of salient poles carried by said supporting portion, energizing windings surrounding said poles, and a closed-circuit winding comprising conductor bars passing through said poles adjacent the polar faces thereof, and means for interconnecting the ends of said conductor bars, said interconnecting means comprising circumferentially spaced connecting members less in number than said conductor bars and fixedly secured in position relative to said core element, and each of said connecting members serving to establish the active current path between a plurality of said peripheral conductor bars on one of said poles and said supporting portion of the core element.

In testimony whereof, the signature of the inventor is affixed hereto.

SOREN H. MORTENSEN.